United States Patent [19]

Kitahara et al.

[11] Patent Number: 4,788,250

[45] Date of Patent: Nov. 29, 1988

[54] THERMOPLASTIC RESIN COMPOSITION OF ETHYLENE-PROPYLENE-NON-CONJUGATED DIENE TERPOLYMER RUBBER HAVING IMPROVED COMBINED PROPERTIES OF WEATHER RESISTANCE AND MOLDING APPEARANCE

[75] Inventors: Haruyoshi Kitahara; Yasuaki II; Yutaka Toyooka, all of Ohtake, Japan

[73] Assignee: Mitsubishi Rayon Co., Ltd., Tokyo, Japan

[21] Appl. No.: 105,540

[22] Filed: Oct. 8, 1987

[30] Foreign Application Priority Data

Oct. 9, 1986 [JP] Japan .................................. 61-239201

[51] Int. Cl.$^4$ ............................................. C08L 69/00
[52] U.S. Cl. ......................................... 525/67; 525/73; 525/80; 525/83; 525/86
[58] Field of Search ....................... 525/67, 70, 73, 80, 525/83, 86

[56] References Cited

U.S. PATENT DOCUMENTS 4,690,974  9/1987  Sugimori et al. ..................... 525/64
4,705,827  11/1987 Kodama et al. ..................... 525/67

Primary Examiner—Theodore E. Pertilla
Attorney, Agent, or Firm—Cushman, Darby & Cushman

[57]  ABSTRACT

Disclosed is a thermoplastic resin composition comprising a graft polymer resin (I) obtained by polymerizing one or more monomers (b) selected from the group consisting of aromatic vinyl compounds and ethylenically unsaturated compounds, in the presence of a latex of an ethylene-propylene-non-conjugated diene terpolymer rubber (a) having a specific gel content and a specific particle diameter, so that the graft polymer resin contains a specific proportion of the rubber (a); and a rigid thermoplastic resin (II). This resin composition has excellent weather resistance and impact resistance, and yields molded articles having a good surface gloss.

3 Claims, No Drawings

THERMOPLASTIC RESIN COMPOSITION OF ETHYLENE-PROPYLENE-NON-CONJUGATED DIENE TERPOLYMER RUBBER HAVING IMPROVED COMBINED PROPERTIES OF WEATHER RESISTANCE AND MOLDING APPEARANCE

BACKGROUND OF THE INVENTION

1. Field of the Invention

This invention relates to a thermoplastic resin composition having excellent impact resistance, weather resistance and moldability.

2. Description of the Prior Art

ABS resin is a thermoplastic resin having a well-balanced combination of impact resistance, thermal and mechanical properties, and moldability, and has conventionally been used in wide applications including electrical parts, automobile parts and other miscellaneous goods. However, it is well known that ABS resin is subject to deterioration by ultraviolet light or the like and hence exhibits poor weather resistance, because the butadiene-based polymer constituting its rubber component for imparting impact resistance to the resin has a large number of chemically unstable double bonds in the backbone.

In order to improve the weather resistance of ABS resin, there have been proposed a number of processes for the preparation of an impact-resistant resin by using a saturated rubbery polymer having few double bonds in the backbone. Typical examples of such processes are those using an ethylene-propylene-non-conjugated diene terpolymer rubber.

These processes for the preparation of an impact-resistant resin include a bulk polymerization process (as disclosed in U.S. Pat. No. 3,435,096), solution polymerization processes (as disclosed in U.S. Pat. Nos. 3,538,190 and 3,538,191) and the like. Moreover, there have been proposed emulsion polymerization processes in which an ethylene-propylene-non-conjugated diene terpolymer rubber is emulsified, partially crosslinked and then subjected to graft polymerization (Japanese Patent Publication Nos. 16394/'68 and 35718/'73).

In Japanese Patent Publication No. 16394/'68, it is stated that the impact strength of the resulting resin is markedly improved by cross-linking a part of the ethylene-propylene-non-conjugated diene terpolymer latex. However, when the degree of cross-linking (i.e., the gel content) is at such a low level as described in the examples of that patent, the resulting resin exhibits good impact strength but fails to present an attractive molding appearance.

In Japanese Patent Publication No. 35718/'73, it has been proposed to improve polymerization stability by carrying out the graft polymerization in the presence of a hydrocarbon. This proposition has been made because the ethylene-propylene-non-conjugated diene terpolymer latex, which is emulsified by mechanical means, tends to have poor stability. However, the ethylene-propylene-non-conjugated diene terpolymer rubber used in the examples of that patent has a low degree of cross-linking and the resulting resin fails to present an attractive molding appearance.

Thus, graft copolymers obtained by the processes described in the above-referenced patents have better weather resistance than ABS resin, because an ethylene-propylene-non-conjugated diene terpolymer rubber is used as the rubber component. However, the external appearance and surface gloss of molded articles formed therefrom are still unsatisfactory. In the existing state of the art, therefore, a thermoplastic resin having a desired combination of excellent weather resistance and attractive molding appearance is not yet available.

SUMMARY OF THE INVENTION

It is an object of the present invention to provide a thermoplastic resin having excellent weather resistance and impact resistance and yielding molded articles having a good surface gloss.

According to the present invention, there is provided a thermoplastic resin composition comprising 5 to 80 parts by weight of a graft polymer resin (1) obtained by polymerizing 10 to 60% by weight of at least one monomer (b) selected from the group consisting of aromatic vinyl compounds and ethylenically unsaturated compounds of the general formula:

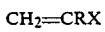

where R is —H or —CH$_3$, X is —CN or —COOR$^1$, and R$^1$ is an alkyl group having 1 to 8 carbon atoms, in the presence of 90 to 40% by weight (on a solid basis) of a latex of an ethylene-propylene-non-conjugated diene terpolymer rubber (a) having a gel content of 50 to 95% and a particle diameter of 0.05 to 2 μm, the combined amount of (a) and (b) being 100% by weight; and 20 to 95 parts by weight of a rigid thermoplastic resin (2), provided that the combined amount of (1) and (2) is 100 parts by weight.

The essential feature of the present invention is that a certain monomer (b) is subjected to graft polymerization in the presence of a latex of an ethylene-propylene-non-conjugated diene terpolymer rubber (a) having a specific gel content and a specific particle diameter, in such a way as to give a high rubber content of 40 to 90% by weight, and the resulting graft polymer resin (1) is blended with a rigid thermoplastic resin (2). This makes it possible to achieve an attractive molding appearance, good surface gloss and high impact resistance which have not been obtainable in the prior art. Moreover, it should be noted that this high rubber content markedly improves the stability of the graft polymerization and permits stable preparation of the graft polymer resin (1).

DETAILED DESCRIPTION OF THE PREFERRED EMBODIMENTS

The ethylene-propylene-non-conjugated diene terpolymer rubber used in the present invention is an ethylene-propylene-non-conjugated diene terpolymer (hereinafter referred to as EPDM) composed of ethylene, propylene and a third component comprising one or more one-conjugated dienes such as dicyclopentadiene, ethylidenenorbornene, 1,4-hexadiene, 1,5-hexadiene, 2-methyl-1,5-hexadiene, 1,4-cycloheptadiene and 1,5-cyclooctadiene.

Among various EPDMs, ones containing dicyclopentadiene and/or ethylidene norbornene as the non-conjugated diene component are preferred.

It is preferable that the molar ratio of ethylene to propylene present in EPDM range from 5:1 to 1:3, and it is also preferable that the content of unsaturated groups in EPDM correspond to an iodine value of 4 to 50.

Although no limitation is placed on the method for forming a latex of EPDM, it is common practice to subject EPDM to a mechanical shear in the presence of an emulsifier and thereby form a latex having finely divided particles of EPDM dispersed in water.

It is essential that the particle diameter of the EPDM latex be in the range of 0.05 to 2 μm. If the particle diameter is smaller than 0.05 μm, satisfactorily high impact strength will not be obtained. If the particle diameter is larger than 2 μm, the polymerization system will become unstable and molded articles formed with the resulting graft polymer resin may fail to exhibit a good gloss.

It is also essential that the EPDM used in the present invention be crosslinked. If it is not cross-linked, poor impact strength will result and, moreover, molded articles formed at high temperature will develop marked defects in appearance. When the degree of cross-linking is expressed in terms of gel content, the EPDM should have a gel content of 50 to 95%. If the gel content is less than 50%, the resulting molded articles will be markedly anisotropic and have a poor gloss. If the gel content is greater than 95%, low impact strength will result.

The EPDM latex can contain a small amount (i.e., not greater than 30%) of one or more other rubbers according to the intended purpose. Examples of such rubbers include polybutadiene, polyisoprene and styrene-butadiene rubber. Although these other rubbers may be blended with EPDM, the content of EPM in the rubber latex should preferably be maximized when it is desired to obtain good weather resistance.

The graft polymer resin (1) used in the thermoplastic resin of the present invention is prepared by emulsion polymerization.

In preparing the thermoplastic resin composition of the present invention, 10 to 60% by weight of at least one monomer (b) selected from the group consisting of aromatic vinyl compounds and ethylenically unsaturated compounds of the general formula:

$$CH_2=CRX$$

where R is —H or —CH$_3$, X is —CN or —COOR$^1$, and R$^1$ is an alkyl group having 1 to 8 carbon atoms, is polymerized in the presence of 90 to 40% by weight (on a solid basis) of a latex of EPDM having a gel content of 50 to 95% and a particle diameter of 0.05 to 2 um, provided that the combined amount of (a) and (b) is 100% by weight. This polymerization is carried out in the presence of a radical polymerization initiator by adding the monomer (b) to the latex at one time, in portions or continuously.

In order to achieve an attractive molding appearance, good surface gloss and high impact strength, it is important that the content of EPDM (a) in the graft polymer resin (1) be in the range of 40 to 90% by weight. If the EPDM content is less than 40% by weight, a low surface gloss will result. On the other hand, if the EPDM content is greater than 90% by weight, the amount of polymer grafted to EPDM will be so small that, when blended with a rigid thermoplastic resin, the rubber will exhibit poor dispersibility, resulting in a low surface gloss again. Moreover, it should be noted that this high EPDM content of not less than 40% by weight markedly improves the stability of the graft polymerization and permits stable preparation of the graft polymer resin (1). Furthermore, stabilization of the latex minimizes the production of agglomerates and this is also believed to be effective in improving the surface gloss.

As the polymerization initiator, there can be used thermally decomposable initiators such as potassium persulfate, ammonium persulfate, etc., and redox initiators such as sugar-containing pyrophosphate formulations comprising a combination of cumene hydroperoxide, an iron compound, sodium pyrophosphate and dextrose. In the latter type of initators, tertbutyl hydroperoxide, diisopropylbenzene hydroperoxide or the like may be used in place of cumene hydroperoxide. Moreover, ethylenediaminetertaacetic acid disodium salt (EDTA-2Na) may be used in place of scdium hyrophosphate, and formaldehyde sodium sulfoxylate may be used in place of dextrose.

In order to further improve the stability of the graft polymerization, it is preferable to stabilize the polymerization mixture by adding an additional emulsifier thereto. To this end, there may be used any conventional anionic emulsifiers that can be used in emulsion polymerization. However, it is common practice to use, for example, fatty acid soap, or rosin soap.

Typical examples of the aforesaid aromatic vinyl compounds include styrene, α-methylstyrene, vinyltoluene and tert-butylstyrene. Typical examples of the ethylenically unsaturated compounds of the general formula CH$_2$=CRX include acrylonitrile; methacrylonitrile; and methyl, ethyl, propyl, butyl and like esters or acrylic acid or methacrylic acid.

When the aforesaid monomer or monomer mixture is subjected to graft polymerization, a small amount of a cross-linking agent or a graft-linking agent can be used. Useful cross-linking agents and graft-linking agents include divinylbenzene, ethylene glycol dimethacrylate, triallyl cyanurate, triallyl isocyanurate and allyl methacrylate.

The resulting graft polymer resin (1) should preferably have a degree of grafting of 10 to 100%. Moreover, the free (co)polymer obtained by extracting the graft polymer resin (1) with acetone should preferably have a reduced viscosity of ($\eta_{sp}/c$) of 0.3 to 1 as measured by a 0.2 wt. % solution in dimethylformamide at 25° C. If the degree of grafting is less than 10%, low impact strength will result and molded articles will have a poor gloss. If the degree of grafting is greater than 100%, poor processability (flow characteristic) and low impact strength will result. If the reduced viscosity ($\eta_{sp}/c$) of the free (co)polymer is less than 0.3, low impact strength will result, and if it is greater than 1, poor processability (flow characteristic) will result.

The graft copolymer resin (1) thus obtained is used in the form of a resin composition obtained by blending it with a separately prepared rigid thermoplastic resin (2) in such a proportion that the amount of the graft polymer resin (1) present in the resulting resin composition is from 5 to 80% by weight based on the combined amount of (1) and (2).

As the aforesaid rigid thermoplastic resin (2), there may be used any thermoplastic resin that is rigid at ordinary temperatues. However, preferred examples thereof include acrylonitrile-butadiene-styrene terpolymer (ABS resin), acrylonitrile-acrylic rubber-styrene copolymer (AAS resin), aromatic vinyl compound-acrylonitrile copolymers, aromatic vinly compound-acrylonitrile-melthyl methacrylate terpolymers, polymethyl methacrylate, styrene-acrylonitrile-N-phenylmaleimide terpolymer, α-methylstyrene-styrene-acrylonitrile-N-phenylmaleimide quaternary copolymer α-methylstyrene-acrylonitrile-N-phenylmaleimide terpolymer, aromatic vinyl compound-acrylonitrilelower alkyl acrylate terpolymers, acrylonitrile-lower alkyl acrylate copolymers, polyvinly chloride and polycarbonates. These rigid resins may also be used in admixture of two or more.

If desired, the thermoplastic resin compostion of the present invention can additionally contain various colorants such as dyes and pigments; lubricants such as metallic soaps; light stabilizers such as hindered amine compound, benzotriazole compounds, benzophenone copounds and mixtures thereof; heat stabilizers such as hindred phenol compounds, thioether compounds, phosphite compounds and mixtures thereof; granular, powdery or fibrous inorganic fillers and organic fillers; and blowing agents.

This composition can be processed by various processing techniques such as injection molding or extrusion molding, and can be used as a variety of molded articles having excellent impact resistance and weather resistance, or as a component of laminated structures (for example, as the outermost layer exposed to sunlight).

The present invention is further illustrated by the following examples. In these examples, percentages and parts are by weight. The properties of the resulting resin compositions were evaluated according to the following procedures.

(1) Izod impact strength (Iz)

Izod impact strength (in kg·cm/cm) was measured according to ASTM D-256.

(2) Melt flow index (MI)

Using a melt indexer (manufactured by Toyo-Baldwin Co.), melt flow index was measured according to ASTM D-1238 (200° C., 5 kg load).

(3) Rockwell hardness (R)

Rockwell hardness was measured according to ASTM D-785 (R scale).

(4) Vicat softening temperature (VST)

Vicat softening temperature (in °C.) was measured according to ISO R-306 (5 kg load):

(5) Gloss

Using a digital variable angle gloss meter (manufactured by Suga Testing Machine Co.), gloss has measured at an angle of incidence of 60°.

(6) Gel content

A sample was added to boiling toluene and this mixture was refluxed for 6 hours. The insolulbe residue was then separated by filtration through a 100-mesh wire screen, dried and weighed. The insoluble content so determined was regarded as the gel content.

EXAMPLE 1

| | |
|---|---|
| EPDM latex (containing ethylidene norbornene and having an average particle diameter of 0.5 μm, a gel content of 60% and an iodine value of 15) | 50 parts (on a solid basis) |
| Disproportionated potassium rosinate | 1 part |
| Sodium pyrophosphate | 0.5 part |
| Ferrous sulfate | 0.005 part |
| Dextrose | 0.6 part |
| Deionized water | 200 parts |

A mixture consisting of the above components was charged into a reaction vessel and heated to 70° C. While this mixture was stirred, a separately prepared solution containing 15 parts of acrylonitrile (AN), 35 parts of styrene (ST), 0.25 part of cumene hydroperoxide (CHP) and 0.2 part of tert-dodecyl mercaptan (t-DM) was added dropwise thereto over a period of 2 hours. After completion of the addition, the stirring was continued for an additional hour to obtain a graft polymer resin.

The resulting latex of the graft polymer resin was coagulated with dilute sulfuric acid. The coagulum so formed was dehydrated and dried to recover a white powder.

[Determination of the degree of grafting and reduced viscosity ($\eta_{sp}/c$) of the graft polymer resin (these procedures were also employed in all of the following examples and comparative examples)]

A sample of the above latex of graft polymer resin was coagulated with isopropyl alcohol and the resulting coagulum was dried to obtain a powder. 1 g of the powder was dissolved or dispersed in 200 ml of acetone and this mixture was refluxed at 70° C. for 4 hours. The acetone dispersion was centrifuged and thereby separated into a soluble fraction and an insoluble fraction. By drying and weighing the insoluble fraction, the degree of grafting was estimated to be 25%. Separately, the acetone was evaporated from the acetone soluble fraction to recover a free acrylonitrile-styrene copolymer (AS resin). 0.1 g of this AS resin was dissolved in 50 ml of dimethylformamide and used to measure its reduced viscosity ($\eta_{sp}/c$) at 25° C. Thus, the reduced viscosity was found to be 0.55.

[Preparation of a resin composition]

To a mixture composed of 40 parts of the graft polymer resin powder obtained in the above-described manner and 60 parts of separately prepared AS resin I [AN/ST=30/70 (by weight), $\eta_{sp}/c=0.65$] were added 0.5 part of calcium stearate and 0.2 part of triphenyl phosphite. The resulting mixture was blended in a Henschel mixer. Then, using a 40 mmφ single-screw extruder, the blend was pelletized at 200° C. and 150 rpm. Specific basic properties and the molding appearance of the resin composition thus obtained were evaluated. The results of evaluation are shown in Table 1.

EXAMPLE 2

| | |
|---|---|
| EPDM latex (containing ethylidene norbornene and having an average particle diameter of 0.5 μm, a gel content of 50% and an iodine value of 20) | 60 parts (on a solid basis) |
| Potassium oleate | 1 part |
| Sodium pyrophosphate | 0.5 part |
| Ferrous sulfate | 0.005 part |
| Dextrose | 0.6 part |
| Deionized water | 200 parts |

A mixture consisting of the above components was charged into a reaction vessel and heated to 70° C. Then, a mixed solution containing 5 parts of AN, 15 parts of ST, 0.075 part of triallyl cyanurate and 0.1 part of CHP was added dropwise thereto over a period of 60 minutes. Subsequently, a mixed solution containing 5 parts of AN, 15 parts of ST, 0.06 part of t-DM and 0.075 part of CHP was added dropwise thereto over a period of 60 minutes. Thereafter, while the temperature was held at 70° C., the stirring was continued for an additional 60 minutes to complete the reaction. The resulting graft polymer resin had a degree of grafting of 28% and a reduced viscosity ($\eta_{sp}/c$) of 0.41. This graft polymer was coagulated and recovered in the same manner as described in Example 1. To 33.3 parts of the graft polymer resin powder thus obtained were added 66.7 parts of the aforesaid AS resin I, 0.5 part of calcium stearate and 0.2 part of tris(nonylphenyl) phosphite. The resulting mixture was blended in a Henschel mixer. Then, using a 40 mmφ extruder, the blend was pelletized at 200° C. and 150 rpm. Specific basic properties and the molding appearance of the resin composition thus obtained were evaluated. The results of evaluation are shown in Table 1.

REFERENTIAL EXAMPLE 1

Graft polymerization was carried out in the same manner as described in Example 1, except that the amount of t-DM used was increased from 0.2 part to 1.0 part. The resulting graft polymer resin had a degree of grafting of 8% and a reduced viscosity ($\eta_{sp}/c$) of 0.25. This graft polymer resin was blended with AS resin I in the same manner and proportion as described in Example 1. Specific basic properties and the molding appearance of the resin composition thus obtained were evaluated. The results of evaluation are shown in Table 1.

REFERENTIAL EXAMPLE 2

Graft polymerization was carried out in the same manner as described in Example 1, except that t-DM was omitted. The resulting graft polymer resin had a degree of grafting of 45% and a reduced viscosity ($\eta_{sp}/c$) of 1.32. This graft polymer resin was blended with AS resin I in the same manner and proportion as described in Example 1. Specific basic properties and the molding appearance of the resin composition thus obtained were evaluated. The results of evaluation are shown in Table 1.

COMPARATIVE EXAMPLE 1

Graft polymerization was carried out in the same manner as described in Example 1, except that an EPDM latex having an average particle diameter of 2.5 μm instead of 0.5 μm was used. In the course of the polymerization, the polymerization system became unstable and showed agglomeration. Thus, the polymerization could not be continued to the end.

COMPARATIVE EXAMPLE 2

A graft polymer resin was prepared in the same manner as described in Example 1, except that an EPDM latex having a gel content of 20% was used. This graft polymer resin was blended with AS resin I in the same manner and proportion as described in Example 1. The resin composition thus obtained was evaluated in the same manner as described in Example 1. The results of evaluation are shown in Table 1.

TABLE 1

| | Graft structure | | Basic properties | | | | | |
|---|---|---|---|---|---|---|---|---|
| | Degree of grafting (%) | $\eta_{sp}/c$ | Iz (kg · cm/cm) | MI (g/10 min.) | R (R scale) | VST (°C.) | Gloss* (200° C.) | Molding appearance |
| Example 1 | 25 | 0.55 | 15 | 1.5 | 99 | 98 | 85 | Good |
| Example 2 | 28 | 0.41 | 22 | 1.1 | 98 | 100 | 89 | Good |
| Referential Example 1 | 8 | 0.28 | 3.5 | 2.5 | 99 | 99 | 44 | Poor |
| Referential Example 2 | 45 | 1.32 | 6.3 | 0.8 | 103 | 98 | 35 | Poor |
| Comparative Example 1 | Agglomerated during graft polymerization | — | — | — | — | — | — | — |
| Comparative Example 2 | 29 | 0.52 | 18 | 1.6 | 100 | 98 | 49 | Poor |

*Using a 1-ounce injection molding machine (SAV-30A; manufactured by Sanjo Seiki K.K.), flat plates measuring 50 × 80 × 3 mm were molded at a resin temperature of 200° C. (and a mold temperature of 60° C.). The resulting flat plates were examined for gloss and molding appearance.

EXAMPLES 3 to 8

35 parts of the graft polymer resin obtained in Example 2 was mixed with 65 parts of each of various rigid resins. Then, 0.5 part of calcium stearate and 0.2 part of triphenyl phosphite were added thereto. The resulting mixture was blended in a Henschel mixer and then pelletized by means of a 40 mmφ extruder. Specific basic properties and the molding appearance of the resins thus obtained were evaluated. The results of evaluation are shown in Table 2.

The rigid resins used in these examples were as follows:
Copolymer I: AN-α-methylstyrene (αMS) copolymer [AN/αMS=20/80 (by weight), $N_{sp}/c$=0.59].
Copolymer II: AN-αMS-N-phenylmaleimide (NPM) copolymer [AN/αMS/NPM=20/65/15 (by weight), $\eta_{sp}/c$=0.6].
Polycarbonate (PC) resin: 7022PJ (manufactured by Mitsubishi Chemical Industries, Ltd.).
ABS resin: DIAPET® ABS #1001 (manufactured by Mitsubishi Rayon Co., Ltd.).
AAS resin: DIALAC® AAS S310 (manufactured by Mitsubishi Rayon Co., Ltd.).
PMMA resin: ACRYPET® VH (manufactured by Mitsubishi Rayon Co., Ltd.).

COMPARATIVE EXAMPLES 3 to 6

The following commercially-available AES resins were evaluated in the same manner as described in Example 1. The results of evaluation are shown in Table 2.
AES resin I: AES #110 (high-impact grade; manufactured by Japan Synthetic Rubber Co., Ltd.).
AES resin II: AES #147 (heat-resistant grade; manufactured by Japan Synthetic Rubber Co., Ltd.).
AES resin III: Unibright UB-500 (high-impact grade; manufactured by Sumitomo Naugatuck Co., Ltd.)
AES resin IV: Unibright UB-800 (heat-resistant grade; manufactured by Sumitomo Naugatuck Co., Ltd.).

TABLE 2

| | Rigid resin (parts) | | | | | | Basic properties | | | | |
|---|---|---|---|---|---|---|---|---|---|---|---|
| | Copolymer I | Copolymer II | Polycarbonate resin | ABS resin | AAS resin | PMMA resin | Iz (kg·cm/cm) | MI (g/10 min.) | R (R scale) | VST (°C.) | Gloss* |
| Example 3 | 65 | | | | | | 10 | 0.2 | 100 | 114 | 85 |
| Example 4 | | 65 | | | | | 9 | 0.08 | 100 | 128 | 90 |
| Example 5 | | | 65 | | | | 55 | 0.4 | 102 | 126 | 89 |
| Example 6 | | | | 65 | | | 30 | 1.0 | 95 | 95 | 90 |
| Example 7 | | | | | 65 | | 25 | 0.8 | 92 | 96 | 80 |
| Example 8 | | | | | | 65 | 15 | 0.1 | 105 | 95 | 92 |
| Comparative Example 3 | Moldings of AES resin I alone were evaluated. | | | | | | 17.6 | 2.13 | 103.5 | 93.6 | 75 |
| Comparative Example 4 | Moldings of AES resin II alone were evaluated. | | | | | | 8.1 | 0.42 | 103.0 | 103.2 | 65 |
| Comparative Example 5 | Moldings of AES resin III alone were evaluated. | | | | | | 16.4 | 1.57 | 103.7 | 99.5 | 70 |
| Comparative Example 6 | Moldings of AES resin IV alone were evaluated. | | | | | | 11.8 | 0.52 | 93.5 | 101.7 | 65 |

*Using a 1-ounce injection molding machine (SAV-30A; manufactured by Sanjo Seiki K.K.), flat plates measuring 50 × 80 × 3 mm were molded at a resin temperature of 200° C. for Examples 6 and 7 and Comparative Examples 3-6 or 250° C. for Examples 3-5 and 8 (and a mold temperature of 60° C.). The resulting flat plates were examined for gloss and molding appearance.

COMPARATIVE EXAMPLE 7 AND EXAMPLES 9 and 10

Graft polymerization was carried out in the same manner as described in Example 1, except that three different types of EPDM latexes was used. All of the EPDM latexes contained ethylidene norbornene as the non-conjugated diene component and had an average particle diameter of 0.5 μm and an iodine value of 20, but their gel contents were 40% (Comparative Example 7), 70% (Example 9) and 90% (Example 10), respectively. In each case, the latex continued to have very good stability and no agglomerates were observed when the latex was filtered through a #100 wire screen. The graft structure of the resulting graft polymer resin is shown in Table 3. The recovered graft polymer resin powder was blended with an AS resin, calcium stearate and triphenyl phosphite in the same manner as described in Example 1. Specific basic properties and the molding appearance of the resin compositions thus obtained were evaluated. The results of evaluation are shown in Table 3. It is evident from the results of Table 3 that the gel content of the EPDM latex exerted an influence on the basic properties and molding appearance of the resulting resin composition. Specifically, when the gel content was low, the molded articles had a low gloss and tended to show iridescence, thus presenting a rather poor appearance. Accordingly, the resin compostion, though exhibiting good basic properties, could not be regarded as a molding material having a well-balanced combination of properties. In contrast, when the gel content was not less than 50%, the resin composition had an attractive molding appearance as well as good basic properties.

COMPARATIVE EXAMPLE 8

The same additional emulsifier and initiator as used in Example 1 were mixed with 20 parts (on a solid basis) of the same EPDM latex as used in Example 9. Then, a solution containing 20 parts of AN, 60 parts of ST, 0.4 part of CHP and 0.25 part of t-DM was added dropwise thereto over a period of 3 hours, followed by standing for an hour. In this case, the latex had such poor stability that 1.4% by weight, based on the polymer, of agglomerates were collected when the latex was filtered through a #100 wire screen. Specimens were molded of the resulting polymer and specific basic properties and the molding appearance were evaluated. The results of evaluation are shown in Table 3.

TABLE 3

| | Graft structure | | Basic properties | | | | |
|---|---|---|---|---|---|---|---|
| | Degree of grafting (%) | $\eta_{sp}/c$ | Iz (kg·cm/cm) | MI (g/10 min.) | R (R scale) | VST (°C.) | Gloss (200° C.) |
| Comparative Example 7 | 26 | 0.36 | 17 | 1.9 | 98 | 98 | 54 |
| Example 9 | 45 | 0.42 | 32 | 1.5 | 99 | 99 | 89 |
| Example 10 | 53 | 0.41 | 21 | 1.4 | 99 | 100 | 90 |
| Comparative Example 8 | 92 | 0.48 | 20 | 1.2 | 97 | 97 | 68 |

EXAMPLE 11

| | |
|---|---|
| EPDM latex (containing ethylidene norbornene and having an average particle diameter of 0.5 μm, a gel content of 70% and an iodine value of 15) | 70 parts (on a solid basis) |
| Potassium oleate | 1 part |
| Ferrous sulfate | 0.001 part |
| Ethylenediaminetetraacetic acid disodium salt | 0.003 part |
| Rongalite | 0.09 part |
| Deionized water | 200 parts |

A mixture consisting of the above components was charged into a reaction vessel and heated to 70° C. While this mixture was stirred, a solution containing 30 parts of methyl methacrylate (MMA), 0.09 part of t-butyl hydroperoxide and 0.06 part of n-octyl mercaptan was added dropwise thereto over a period of one hour.

After completion of the addition, the stirring was continued for an additional hour to obtain a graft polymer resin. During the polymerization, the latex continued to have good stability and no agglomerates were observed when the latex was filtered through a #100 wire screen. Thereafter, the resulting latex was coagulated with dilute sulfuric acid. The coagulum so formed was dehydrated and dried to obtain a white powder. Then, 28.6 parts of the white powder was blended with 71.4 parts of the PMMA resin used in Example 8 to obtain a polymer blend having a rubber content of 20 parts. Specimens were molded of this polymer blend and evaluated. These specimens had a considerable degree of transparency. They exhibited an Izod impact strength of 8.0 kg·cm/cm and a gloss value of 87.

EXAMPLE 12

A mixture consisting of the same components as described in Example 11 was charged into a reaction vessel and heated to 70° C. Then, a mixture composed of 18 parts of methyl methacrylate and 2 parts of butyl acrylate and containing 0.06 part of tert-butyl hydroperoxide was added dropwise thereto over a period of 1 hour, followed by standing for 30 minutes. Thereafter, 10 parts of methyl methacrylate containing 0.03 part of tert-butyl hydroperoxide was added dropwise thereto over a period of 30 minutes, followed by standing for an hour. During the polymerization, the latex continued to have good stability. Ten parts of the resulting graft polymer resin was mixed with 90 parts of a vinyl chloride resin, 1.5 parts of dibasic lead stearate, 2.0 parts of tribasic lead sulfate, 1.5 parts of lead stearate, 0.5 part of calcium stearate and 0.3 part of stearic acid, and this mixture was subjected to roll milling. Using the resin composition thus obtained, flat plates were formed by press molding. These flat plates had an Izod impact strength of as high as 85 kg·cm/cm and a gloss value of 90.

What is claimed is:

1. A thermoplastic resin composition comprising 5 to 80 parts by weight of a graft polymer resin (1) obtained by polymerizing 10 to 60% by weight of at least one monomer (b) selected from the group consisting of aromatic vinyl compounds and ethylenically unsaturated compounds of the general formula $$CH_2=CRX$$

where R is —H or —$CH_3$, X is —CN or —$COOR^1$, and $R^1$ is an alkyl group having 1 to 3 carbon atoms, in the presence of 90 to 40% by weight (on a solid basis) of latex of an ethylene-propylene-non-conjugated diene terpolymer rubber (a) having a gel content of 50 to 95% and a particle diameter of 0.05 to 2 um, the combined amount of (a) and (b) being 100% by weight; and 20 to 95 parts by weight of a rigid thermoplastic resin (2), provided that the combined amount of (1) and (2) is 100 parts by weight;

said graft polymer resin (1) having a degree of grafting of 10 to 100%, and the free polymer resin obtained by extracting said graft polymer resin (1) with acetone has a reduced viscosity ($\eta_{sp}/c$) of 0.3 to 1.

2. A thermoplastic resin composition as claimed in claim 1 wherein the ethylene-propylene-non-conjugated diene terpolymer rubber (a) has an iodine value of 4 to 50.

3. A thermoplastic resin composition as claimed in claim 1 wherein thenon-conjugated diene component constituting the ethylene-propylene-non-conjugated diene terpolymer rubber (a) is at least one selected from the group consisting of dicyclopentadiene and ethylidene norbornene.

* * * * *